(12) United States Patent
Yamazaki

(10) Patent No.: US 10,379,474 B2
(45) Date of Patent: Aug. 13, 2019

(54) IMAGE FORMING APPARATUS AND UNIT CONTROL DEVICE

(71) Applicant: CANON KABUSHIKI KAISHA, Tokyo (JP)

(72) Inventor: Yoshitaka Yamazaki, Abiko (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/751,756

(22) PCT Filed: Jul. 6, 2016

(86) PCT No.: PCT/JP2016/003219
§ 371 (c)(1),
(2) Date: Feb. 9, 2018

(87) PCT Pub. No.: WO2017/026087
PCT Pub. Date: Feb. 16, 2017

(65) Prior Publication Data
US 2018/0231926 A1    Aug. 16, 2018

(30) Foreign Application Priority Data

Aug. 10, 2015    (JP) ................................ 2015-158535

(51) Int. Cl.
*G03G 15/00* (2006.01)
*G03G 15/01* (2006.01)
(Continued)

(52) U.S. Cl.
CPC .......... *G03G 15/5004* (2013.01); *B41J 29/38* (2013.01); *G03G 15/0189* (2013.01);
(Continued)

(58) Field of Classification Search
CPC .............. G03G 15/80; G03G 15/5004; H02M 2003/1566
See application file for complete search history.

(56) References Cited

U.S. PATENT DOCUMENTS 5,680,294 A * 10/1997 Stora .................... H05K 7/1457
361/695
6,288,881 B1 * 9/2001 Melvin ................. H02J 7/1461
361/104
(Continued)

FOREIGN PATENT DOCUMENTS

JP    2001-272886 A    10/2001
JP    2001-272892 A    10/2001
(Continued)

OTHER PUBLICATIONS

Machine Translation JP, 2003-241589—https://dossier1.j-platpat.inpit.go.jp/cgi-bin/tran_web_cgi_ejje?u=http://dossier1.j-platpat.inpit.go.jp/tri/translation Sep. 25, 2018.*

(Continued)

*Primary Examiner* — John Zimmermann
(74) *Attorney, Agent, or Firm* — Venable LLP

(57) ABSTRACT

Provided is a structure configured to stably supply electric power to functional units forming an image forming apparatus. To achieve this, the image forming apparatus includes: an image creating portion (307Y) serving as a functional unit for forming images; and an apparatus main body including a DC power distribution portion (206) configured to supply electric power to the image creating portion (307Y) and a main controller (219) configured to control operation of the image creating portion (307Y). The image creating portion (307Y) includes a protection circuit (220) and a load to be driven by electric power that is supplied from the DC power distribution portion (206). The protection circuit (220) gradually supplies power source electric power to the load when mounted on the apparatus main body, and immediately shuts off the supply of the electric power to the load when pulled out of the apparatus main body.

12 Claims, 5 Drawing Sheets

(51) Int. Cl.
  *G03G 15/04* (2006.01)
  *G06F 1/30* (2006.01)
  *B41J 29/38* (2006.01)
  *G03G 21/00* (2006.01)
  *G03G 15/23* (2006.01)

(52) U.S. Cl.
  CPC ....... *G03G 15/04072* (2013.01); *G03G 15/55* (2013.01); *G03G 15/80* (2013.01); *G03G 21/00* (2013.01); *G06F 1/30* (2013.01); *G03G 15/234* (2013.01); *G03G 2221/1696* (2013.01)

(56) References Cited

U.S. PATENT DOCUMENTS

| | | | | |
|---|---|---|---|---|
| 2002/0112191 | A1* | 8/2002 | Pelissier | G06F 1/26 713/300 |
| 2004/0201937 | A1* | 10/2004 | Yoshida | H02M 1/32 361/93.7 |
| 2012/0200872 | A1 | 8/2012 | Ito | |
| 2014/0079429 | A1* | 3/2014 | Hamaya | G03G 15/80 399/88 |
| 2016/0028311 | A1* | 1/2016 | Murakami | H02M 3/1588 323/271 |
| 2016/0233659 | A1* | 8/2016 | Barnette | H02H 3/08 |
| 2017/0023905 | A1* | 1/2017 | Tsuchiya | G03G 15/80 |

FOREIGN PATENT DOCUMENTS

| | | |
|---|---|---|
| JP | 2002-304085 A | 10/2002 |
| JP | 2003-098913 A | 4/2003 |
| JP | 2003-241589 A | 8/2003 |
| JP | 2005-224020 A | 8/2005 |
| JP | 2007-118610 A | 5/2007 |
| JP | 2012-179895 A | 9/2012 |
| JP | 2013-250423 A | 12/2013 |

OTHER PUBLICATIONS

Machine Translation JP, 2007-118610—https://dossier1.j-platpat.inpit.go.jp/cgi-bin/tran_web_cgi_ejje?u=http://dossier1.j-platpat.inpit.go.jp/tri/translation Sep. 25, 2018.*

Machine Translation JP, 2005-224020—https://dossier1.j-platpat.inpit.go.jp/cgi-bin/tran_web_cgi_ejje?u=http://dossier1.j-platpat.inpit.go.jp/tri/translation Sep. 25, 2018.*

International Search Report and Written Opinion of the International Search Authority in Application No. PCT/JP2016/003219, dated Aug. 16, 2016.

Office Action in Japanese Patent Application No. 2015-158535, dated May 7, 2019 (with English translation).

* cited by examiner

[Fig. 1]
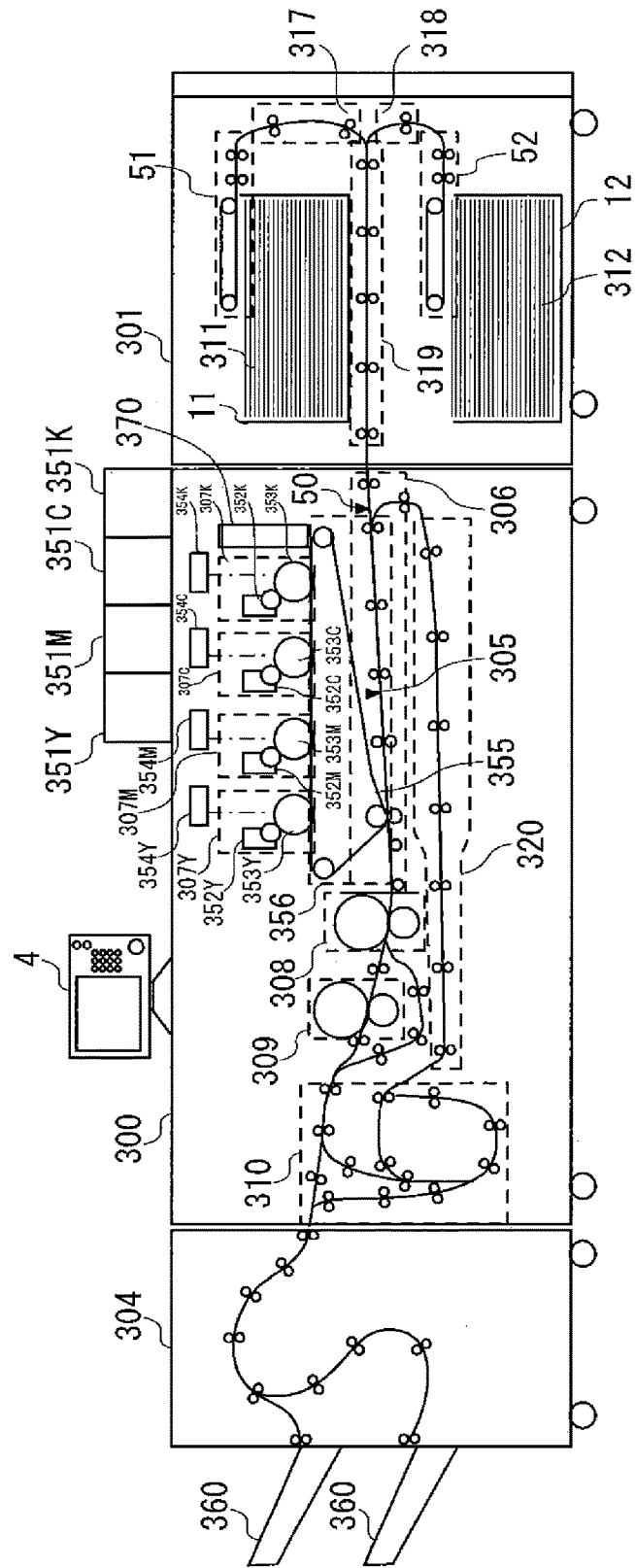

[Fig. 2]
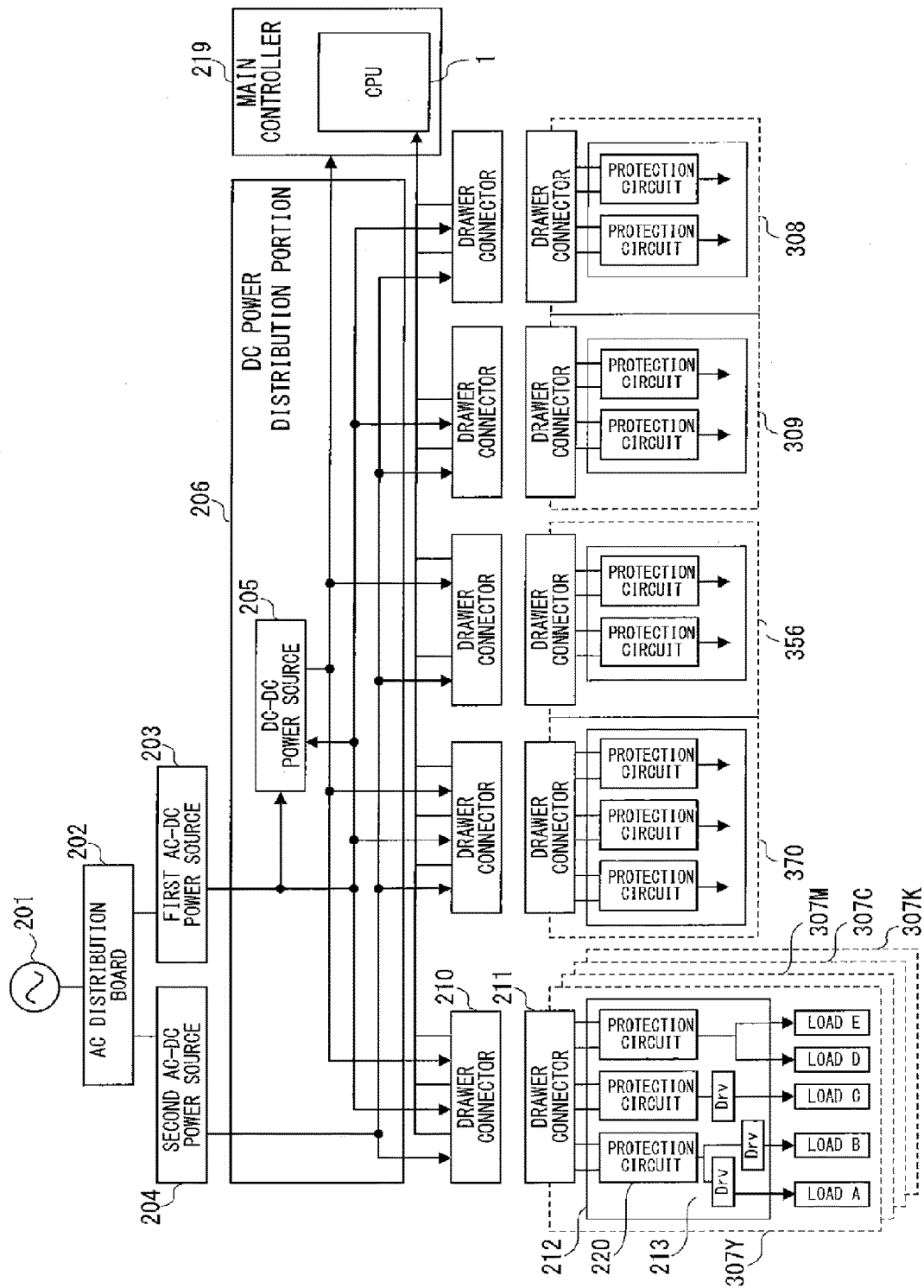

[Fig. 3]
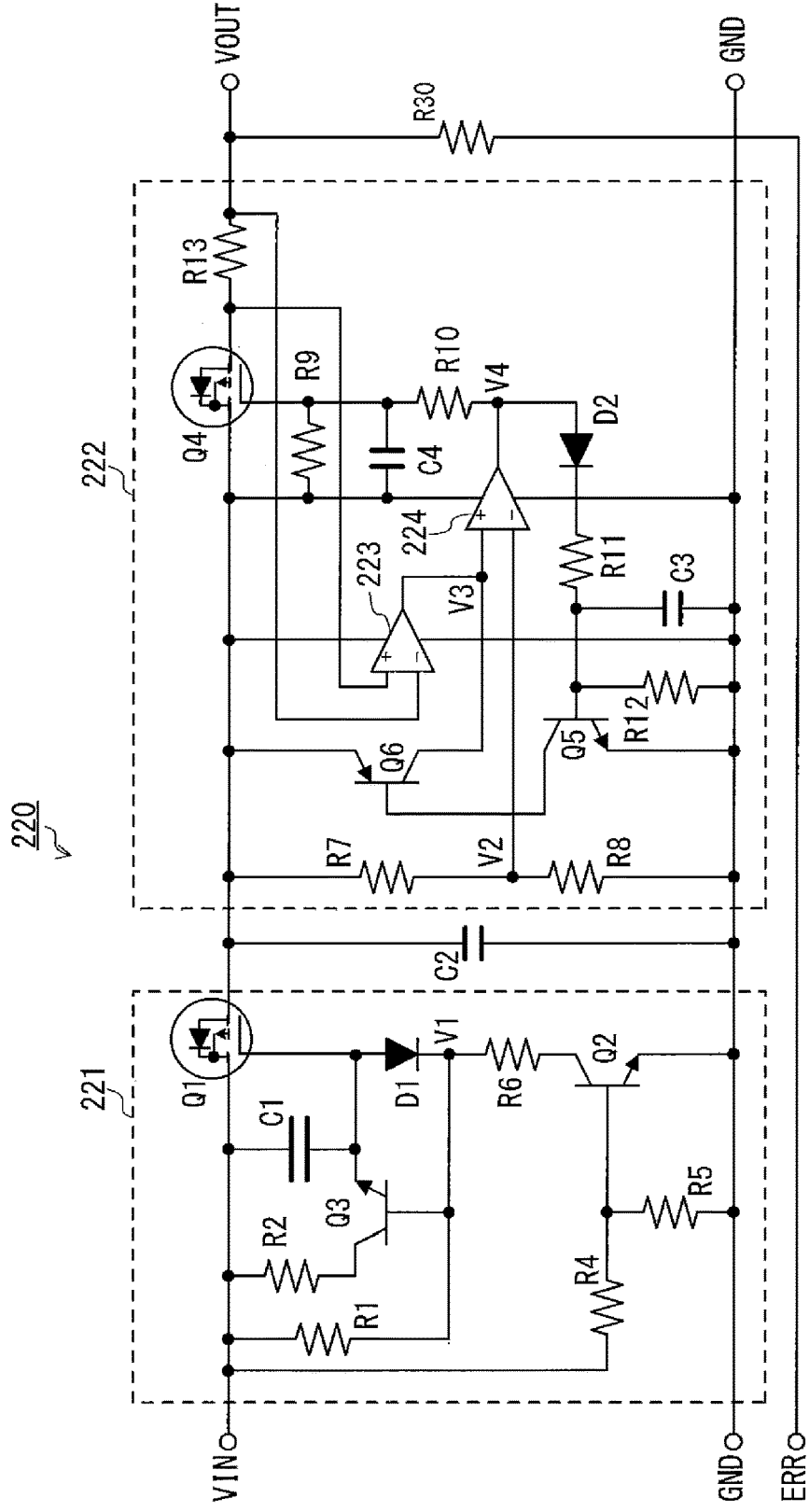

[Fig. 4]
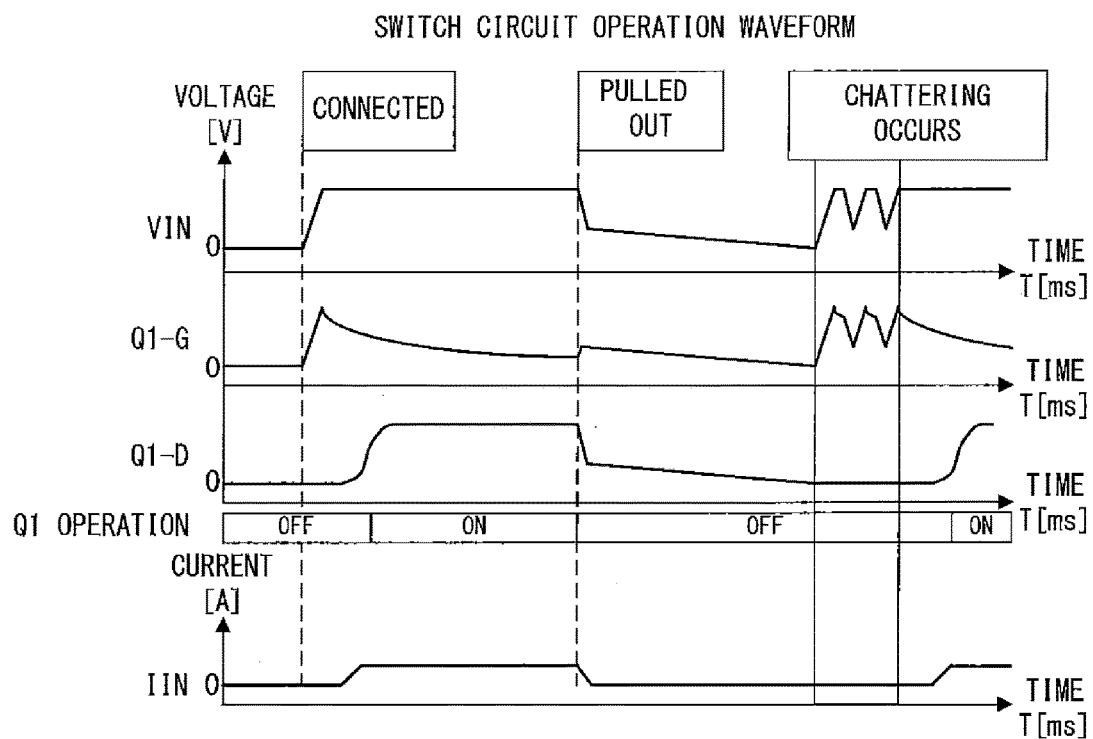

[Fig. 5]
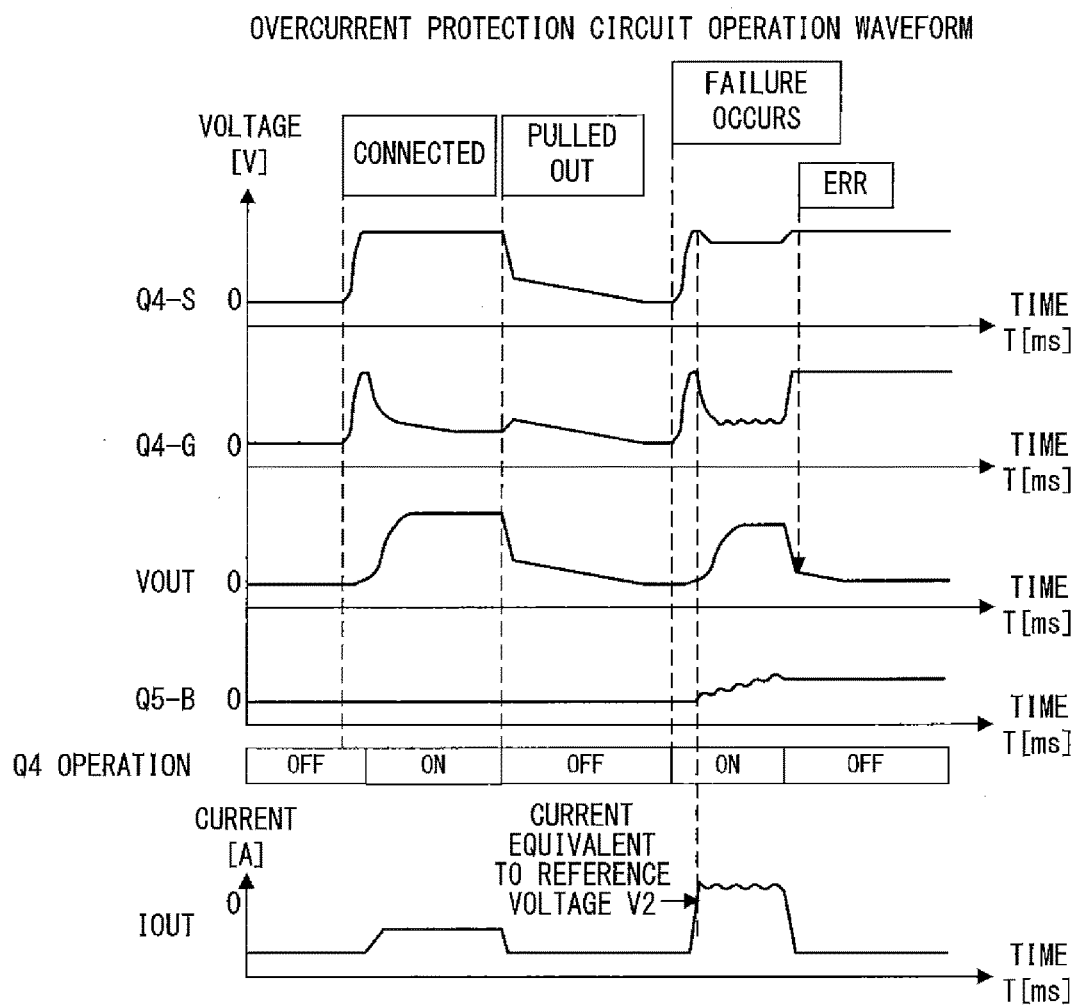

IMAGE FORMING APPARATUS AND UNIT CONTROL DEVICE

TECHNICAL FIELD

The present invention relates to an image forming apparatus including a plurality of functional units each configured to execute a given function.

BACKGROUND ART

Image forming apparatus such as laser beam printers (LBP) and multifunction peripherals (MFP) often include a combination of a plurality of units (functional units) prepared for respective functions. The functional units include conveyance units configured to convey sheets and fixing units configured to fix toner images onto the sheets. Each functional unit is removably inserted into a main body of the image forming apparatus so that a user can easily clear a paper jam, and when a functional unit of the image forming apparatus does not work, parts of the broken functional unit can be easily replaced. Each functional unit is electrically connected to the apparatus main body by drawer connectors that are fitting-type connectors.

The drawer connectors are provided on the functional unit side and the apparatus main body side, respectively. The drawer connectors, which have metal contacts formed in the connecters and are configured to establish energization by contact of the metal contacts, may cause chattering during insertion or removal of the functional unit. Further, when electric power is supplied to the functional unit through the drawer connectors, a large load is applied to a power supply portion on the apparatus main body side because inrush current flows through a capacitive element connected between a power supply line on the functional unit side and a ground. As a result, an overcurrent protection function of the power supply portion may be erroneously activated. In Patent Literature 1, there is described an image forming apparatus that includes, on a functional unit side, detection portions configured to detect connections in order to monitor connection states of functional units on an apparatus main body side. The image forming apparatus is configured to control electric power supply depending on detection signals of the detection portions, to thereby supply electric power to the functional units over a predetermined time so that chattering can be prevented.

CITATION LIST

Patent Literature

PTL 1: Japanese Patent Application Laid-Open No. 2001-272892

SUMMARY OF INVENTION

Technical Problem

Large-scale image forming apparatus include a large number of functional units that are inserted into or removed from the apparatus through drawer connectors, and hence, when the configuration, in which a detection portion is provided for each functional unit, is applied to such apparatus, control of electric power supply is complicated. Further, a circuit scale of a power supply portion on an apparatus main body side is increased as the number of functional units connected thereto is increased. This is a factor of an increase in cost. When image forming apparatus have trouble, it is necessary to detect a power supply failure on a functional unit side, to thereby determine causes. In general, a plurality of power sources configured to supply electric power to functional units are prepared for a control system and a load system. When a structure configured to detect a failure is provided for each power source, a circuit scale of a power supply portion provided on an apparatus main body side is increased, which is a factor of an increase in cost. When a plurality of functional units are integrated to be connected to the same power source in order to reduce the circuit scale, it is difficult to individually determine power supply failure of the respective functional units. As a result, operation of identifying causes of failure takes time, leading to operational problems.

The present invention has been made in view of the above-mentioned problems, and has a primary object to provide a structure configured to stably supply electric power to functional units forming an image forming apparatus.

Solution to Problem

According to one embodiment of the present invention, there is provided an image forming apparatus, including: a plurality of functional units, each of which is configured to serve as hardware configured to execute a given function for forming an image; and an apparatus main body comprising a power source configured to supply electric power to each of the plurality of functional units, and main controller configured to control an operation of the plurality of functional units, the each of the plurality of functional units is configured to be removably inserted into the apparatus main body, the each of the plurality of functional units comprising: a load to be driven by electric power that is supplied from the power source; a switch circuit configured to gradually supply the electric power, which is supplied from the power source, to the load when the functional unit is mounted on the apparatus main body, and to shut off the supply of the electric power to the load when the functional unit is pulled out of the apparatus main body; and an overcurrent protection circuit configured to shut off the supply of the electric power to the load when the overcurrent protection circuit detects failure of the supply of the electric power to the load, and to transmit, to the main controller, a detection signal indicating the failure of the supply of the electric power to the load.

Advantageous Effects of Invention

According to the present invention, the functional units gradually supply electric power when power source electric power is supplied, and immediately shut off the supply of electric power when the supply of power source electric power is shut off. With this configuration, electric power can be stably supplied even when chattering occurs when the functional units are inserted into or removed from the apparatus main body. Causes of failure are easily identified because the functional units are configured to detect power supply failure. A circuit scale of the apparatus main body can be reduced because the functional units each include the overcurrent protection means.

BRIEF DESCRIPTION OF DRAWINGS

FIG. 1 is an exemplary diagram of a configuration of an image forming system.

FIG. 2 is an explanatory diagram of electrical connection between an apparatus main body and each functional unit.

FIG. 3 is a configuration diagram of a protection circuit.

FIG. 4 is a graph for showing operation waveforms of respective elements of a switch circuit.

FIG. 5 is a graph for showing operation waveforms of respective elements of an overcurrent protection circuit.

DESCRIPTION OF EMBODIMENTS

In the following, an embodiment of the present invention is described in detail with reference to the drawings.

FIG. 1 is an exemplary diagram of a configuration of an image forming system of this embodiment. The image forming system includes a sheet feeding apparatus 301, an image forming apparatus 300, an operation portion 4, and a post-processing apparatus 304. Operation of the sheet feeding apparatus 301 and operation of the image forming apparatus 300 are controlled by a single control portion, and operation of the post-processing apparatus 304 is controlled by another control portion. The control portion configured to control the sheet feeding apparatus 301 and the image forming apparatus 300 is a main control portion, which is described later. The image forming system is configured to perform image forming processing on sheets based on sheet processing setting information input from the operation portion 4 or an external device (not shown), and image information input from the external device. The image forming processing includes feeding and conveying sheets, image formation, and post-processing. The sheet feeding apparatus 301 is configured to feed sheets to the image forming apparatus 300. The image forming apparatus 300 is configured to form an image on the fed sheet based on the image information, and to deliver the sheet with the image to the post-processing apparatus 304. The post-processing apparatus 304 is configured to perform post-processing on the sheet having the image formed thereon.

(Sheet Feeding Apparatus)

The sheet feeding apparatus 301 includes sheet-feeding portions 311 and 312 arranged in two stages, suction conveyance units 51 and 52, an upper conveyance portion 317, a lower conveyance portion 318, and a joined conveyance portion 319. The sheet-feeding portions 311 and 312 respectively include storages 11 and 12 configured to store sheets. The sheet feeding apparatus 301 feeds sheets stored in the storage 11 to the image forming apparatus 300 via the suction conveyance unit 51, the upper conveyance portion 317, and the joined conveyance portion 319. And, the sheet feeding apparatus 301 feeds sheets stored in the storage 12 to the image forming apparatus 300 via the suction conveyance unit 52, the lower conveyance portion 318, and the joined conveyance portion 319.

Each of the suction conveyance units 51 and 52 includes an endless belt and a plurality of fans for sucking sheets. The suction conveyance units 51 and 52 perform, on the sheets in the storages 11 and 12, air sheet-feeding control of controlling the fans to send air between the sheets during feeding operation. The suction conveyance units 51 and 52 send air between the sheets with the fans, to thereby convey the sheets while the sheets are being sucked onto the endless belts. The sheets in the storages 11 and 12 are separately conveyed by the suction conveyance units 51 and 52 one by one. The suction conveyance unit 51 conveys a sheet sucked onto the endless belt to the upper conveyance portion 317. The suction conveyance unit 52 conveys a sheet sucked onto the endless belt to the lower conveyance portion 318. The sheet is conveyed to the joined conveyance portion 319 by the upper conveyance portion 317 or the lower conveyance portion 318. The joined conveyance portion 319 feeds the sheet conveyed by the upper conveyance portion 317 or the lower conveyance portion 318 to the image forming apparatus 300.

A reflective optical sheet detection sensor is provided on the sheet conveyance path. The sheet detection sensor detects a passage of leading edges and trailing edges of sheets, to thereby detect positions of the sheets on the conveyance path. Each of the upper conveyance portion 317, the lower conveyance portion 318, and the joined conveyance portion 319 includes a stepping motor for conveying sheets. The control portion controls driving of the stepping motors depending on a result of the detection by the sheet detection sensor. The driving of the stepping motors is mechanically transmitted to conveyance rollers of the upper conveyance portion 317, the lower conveyance portion 318, and the joined conveyance portion 319 to rotate the conveyance rollers, thereby conveying sheets.

The sheet feeding apparatus 301 feeds sheets to the image forming apparatus 300 one by one depending on the sheet processing setting information input from the operation portion 4 or the external device (not shown). The sheet feeding apparatus 301 ends sheet feeding to the image forming apparatus 300 when the number of sheets set in the processing setting information is fed.

(Image Forming Apparatus)

The image forming apparatus 300 includes, in an upper part of an apparatus main body thereof, the operation portion 4 and hopper portions 351Y, 351M, 351C, and 351K configured to house toner bottles for respective colors. The suffixes of reference symbols, namely, Y, M, C, and K represent yellow, magenta, cyan, and black, respectively.

The operation portion 4 is operated by a user so that sheet processing setting information is input thereto. The sheet processing setting information includes sheet information such as sheet sizes, basic weight of sheets, and kinds of sheets (fine paper, coated paper, recycled paper, and special paper), an operation setting for the image forming system such as specification of post-processing and image quality and status information such as temperature and pressure when images are fixed. The user sets sheet information depending on sheets stored in the sheet-feeding portions 311 and 312 of the sheet feeding apparatus 301. The image forming apparatus 300 sets image forming conditions based on the processing setting information to form images.

The image forming apparatus 300 forms, on a sheet fed from the sheet feeding apparatus 301, a color image of superimposed toner images of respective colors: yellow, magenta, cyan, and black. Thus, the image forming apparatus 300 includes a plurality of functional units each of which is hardware configured to execute a given function for forming images. In this embodiment, the image forming apparatus 300 includes, as the functional units, a main conveyance portion 306, image creating portions 307Y, 307M, 307C, and 307K, an image adjustment portion 370, an intermediate transfer portion 356, a first fixing portion 308, a second fixing portion 309, and a delivery portion 310.

The main conveyance portion 306 conveys the sheets fed from the sheet feeding apparatus 301 to the intermediate transfer portion 356. The main conveyance portion 306 includes a registry sensor 50 and an image reference sensor 305. The image forming apparatus 300 starts image forming processing based on image information at a timing at which the registry sensor 50 detects a sheet. The image reference sensor 305 detects a leading edge position of a sheet being conveyed on the main conveyance portion 306. The main conveyance portion 306 adjusts the position of the leading edge portion of the sheet being conveyed depending on a result of the detection by the image reference sensor 305.

The image creating portions 307Y, 307M, 307C, and 307K have the same configuration. The configuration of the image creating portion 307Y is herein described, and description of the configurations of the other image creating portions 307M, 307C, and 307K is omitted.

The image creating portion 307Y includes a photosensitive drum 353Y and a developing device 352Y. In the vicinity of the image creating portion 307Y, a laser scanning unit 354Y configured to emit laser light modulated depending on the image information is arranged. The laser scanning unit 354Y is also one example of the functional unit. The laser scanning unit 354Y includes a semiconductor laser serving as a light source, a rotary polygon mirror for scanning laser light, and a motor configured to rotate the rotary polygon mirror. On the photosensitive drum 353Y, an electrostatic latent image depending on the image information is formed by laser light emitted from the laser scanning unit 354Y. The developing device 352Y deposits yellow developer onto the photosensitive drum 353Y, to thereby develop the electrostatic latent image. In this way, a yellow toner image is formed on the photosensitive drum 353Y.

With similar processing, a magenta toner image is formed on the photosensitive drum 353M of the image creating portion 307M. A cyan toner image is formed on the photosensitive drum 353C of the image creating portion 307C. A black toner image is formed on the photosensitive drum 353K of the image creating portion 307K.

The intermediate transfer portion 356 includes an intermediate transfer belt 355. The intermediate transfer belt 355 is an endless belt configured to rotate while being in contact with the photosensitive drums 353Y, 353M, 353C, and 353K during the image forming processing. The intermediate transfer portion 356 includes rotation rollers for rotating the intermediate transfer belt 355 and a motor configured to drive the rotation rollers to rotate. Toner images of the respective colors formed on the photosensitive drums 353Y, 353M, 353C, and 353K are transferred onto the intermediate transfer belt 355 in a superimposed manner. Transferring toner images from the photosensitive drums 353Y, 353M, 353C, and 353K onto the intermediate transfer belt 355 is referred to as primary transfer. Through the primary transfer, a full-color toner image is formed on the intermediate transfer belt 355.

The image adjustment portion 370 detects the toner images formed on the intermediate transfer belt 355, and transmits a result of the detection to the laser scanning units 354Y, 354M, 354C, and 354K. The laser scanning units 354Y, 354M, 354C, and 354K adjust an amount of laser light and positions of latent images based on the received detection result. In this way, density adjustment and registration of the toner images of the respective colors are performed.

The toner images formed on the intermediate transfer belt 355 are transferred onto a sheet conveyed by the main conveyance portion 306. Transferring toner images from the intermediate transfer belt 355 onto a sheet is referred to as secondary transfer. Through the secondary transfer, a full-color toner image is formed on the sheet.

The main conveyance portion 306 performs, on a sheet yet to be conveyed to a position where the secondary transfer is performed, skew feed correction and registration between the toner image formed on the intermediate transfer belt 355 and a leading edge position of the sheet without stopping the sheet depending on a result of the detection by the image reference sensor 305. The main conveyance portion 306 conveys the sheet having the toner image secondarily transferred thereon to the first fixing portion 308.

The first fixing portion 308 applies heat and pressure on the sheet having the toner image formed thereon so that the toner image can be melted to be fixed to the sheet. Some kinds of sheets such as plain cardboard having 157 grams per square meters (gsm) or more and coated paper are conveyed from the first fixing portion 308 to the second fixing portion 309. The second fixing portion 309 performs re-fixing processing on the sheet, to thereby adjust fixability and glossiness. Temperature control and pressurizing force during the fixing processing by the first fixing portion 308 and the second fixing portion 309 are determined based on the processing setting information. The sheet subjected to the fixing processing is conveyed from the first fixing portion 308 or the second fixing portion 309 to the delivery portion 310.

The delivery portion 310 reverses, if needed, the sheet subjected to the fixing processing and conveys the reversed sheet to a reverse conveyance portion 320, and delivers the sheet to the post-processing apparatus 304 as it is if the reversing is not needed. The reversing is needed when, for example, an image is formed on one side of a sheet in duplex printing. The reverse conveyance portion 320 returns the sheet to the main conveyance portion 306. The sheet returned to the main conveyance portion 306 is subjected to the image forming processing again. The delivery portion 310 and the reverse conveyance portion 320 each include rotation rollers for reversing and conveying sheets and motors configured to drive the rotation rollers to rotate. The reverse conveyance portion 320 is also one example of the functional unit.

Each functional unit forming the image forming apparatus 300 is removably inserted into the apparatus main body of the image forming apparatus 300 by the user or an operator for maintenance. Each functional unit is electrically connected to the apparatus main body by drawer connectors. Each of the image creating portions 307Y, 307M, 307C, and 307K, the image adjustment portion 370, and the intermediate transfer portion 356 are pulled out of the apparatus main body for parts replacement in maintenance and cleaning maintenance. The main conveyance portion 306, the first fixing portion 308, the second fixing portion 309, the delivery portion 310, and the reverse conveyance portion 320 are pulled out of the apparatus main body for clearing a paper jam and maintenance.

(Post-processing Apparatus)

The post-processing apparatus 304 performs post-processing on sheets subjected to the image formation, which are delivered from the image forming apparatus 300. The post-processing includes processing on sheets such as folding, stapling, and punching. The post-processing is instructed by the processing setting information input from the operation portion 4. The post-processing apparatus 304 performs post-processing instructed by the processing setting information. The post-processing apparatus 304 delivers the sheet subjected to the post-processing to a delivery tray 360 as a resultant.

(Electrical Connection of Image Forming Apparatus)

FIG. 2 is an explanatory diagram of electrical connection between the apparatus main body and the each functional unit of the image forming apparatus 300. On the apparatus main body side, an AC distribution board 202, a first AC-DC power source 203, a second AC-DC power source 204, and a DC power distribution portion 206 are included. Those components on the apparatus main body side serve as a power supply portion configured to supply electric power to each functional unit. The DC power distribution portion 206 includes a built-in DC-DC power source 205 whose operation is controlled by a main controller 219. Each functional unit includes a unit control portion 212. The DC power distribution portion 206 includes a drawer connector 210 and the unit control portion 212 of each functional unit includes a drawer connector 211. The DC power distribution portion 206 and the unit control portion 212 are electrically connected to each other by the drawer connectors 210 and 211. The drawer connector 210 serves as a supply-side connector. The drawer connector 211 is connected to the drawer connector 210 when the functional unit is mounted on the apparatus main body. The drawer connector 211 is pulled out of the drawer connector 210 when the functional unit is pulled out of the apparatus main body.

The AC distribution board 202 distributes, to the first AC-DC power source 203 and the second AC-DC power source 204, alternating current (AC) electric power supplied from a commercial power source 201. The AC distribution board 202 includes a built-in filter circuit. The filter circuit removes noise components that are transmitted from the first AC-DC power source 203 and the second AC-DC power source 204 to the commercial power source 201.

Each of the first AC-DC power source 203 and the second AC-DC power source 204 generates, from AC electric power distributed thereto, direct current (DC) electric power to be used inside the image forming apparatus 300. The first AC-DC power source 203 generates a DC voltage of 12 [V] from the AC electric power. The second AC-DC power source 204 generates a DC voltage of 24 [V] from the AC electric power. Each of the first AC-DC power source 203 and the second AC-DC power source 204 inputs the generated DC voltage to the DC power distribution portion 206. In this embodiment, the DC voltages are generated by the two systems, namely, the first AC-DC power source 203 and the second AC-DC power source 204, but more AC-DC power supplies may be included so that more types of DC voltages may be generated. Further, DC voltages to be generated may have voltage values other than above.

The DC power distribution portion 206 supplies, to each functional unit through the drawer connectors 210 and 211, the DC voltages input from the first AC-DC power source 203 and the second AC-DC power source 204. The DC-DC power source 205 converts the DC voltage of 12 [V] input from the first AC-DC power source 203 into a DC voltage of 5 [V]. The DC power distribution portion 206 also supplies the DC voltage generated by the DC-DC power source 205 to each functional unit through the drawer connectors 210 and 211. The DC power distribution portion 206 includes the same number of the drawer connectors 210 as functional units to be mounted or more.

The DC power distribution portion 206 is configured to individually supply, as power supply, necessary DC voltages to the respective functional units. For example, the DC power distribution portion 206 supplies all of the DC voltages to the image creating portions 307Y, 307M, 307C, and 307K and the image adjustment portion 370. However, the DC power distribution portion 206 does not supply the DC voltage of 12 [V] to the intermediate transfer portion 356, and does not supply the DC voltage of 5 [V] to the first fixing portion 308 and the second fixing portion 309.

In this manner, the AC distribution board 202, the first AC-DC power source 203, the second AC-DC power source 204, and the DC power distribution portion 206 generate DC electric power having a plurality of different voltage values from commercial AC electric power, and individually supply DC electric power having respective voltage values to the respective functional units.

Each functional unit includes, in the unit control portion 212, drivers 213 for loads such as motors and sensors of the functional unit, and interface circuits for the respective loads. Protection circuits 220 are connected between the drawer connector 211 of the unit control portion 212 and the drivers 213 or interface circuits per power supply system. The protection circuit 220 prevents power supply failure inside the functional unit from affecting the apparatus main body. Each of the protection circuits 220 transmits, when power supply failure occurs inside the functional unit, a failure detection signal to the main controller 219 on the apparatus main body side through the drawer connectors 211 and 210.

The main controller 219 includes a central processing unit (CPU) 1 configured to control the image forming processing by the image forming apparatus 300. The CPU 1 controls operation of various loads included in the apparatus main body and each functional unit, such as motors, sensors, high-voltage elements, and fixing heaters. The CPU 1 can individually receive failure detection signals from the respective protection circuits 220 of the respective functional units, and monitor in which power supply system of the functional units, power supply failure occurs.

(Details of Protection Circuit)

FIG. 3 is a configuration diagram of the protection circuit 220. The protection circuit 220 corresponds to a power supply input portion of the unit control portion 212, and the drawer connector 211 is connected to the input side of the protection circuit 220. The protection circuit 220 has a VIN terminal to which, as power supply, DC electric power is supplied from the DC power distribution portion 206 through the drawer connectors 210 and 211. The protection circuit 220 has a VOUT terminal that is a terminal for supplying, as power supply, DC electric power to a load connected to a stage subsequent thereto.

The protection circuit 220 has a GND terminal that is common to the ground of the unit control portion 212, and is grounded to a frame of a housing of the functional unit. The ground of the functional unit is common to the ground of the apparatus main body, which means that the GND terminal of the protection circuit 220 is grounded to a frame of the apparatus main body.

The protection circuit 220 has an ERR terminal that is a terminal for transmitting failure detection signals to the main controller 219 when power supply failure occurs in a load. The ERR terminal is connected to the VOUT terminal through a resistor R30. Between a case where a load connected in the subsequent stage normally operates and a case where failure occurs in the load, the voltage of the VOUT terminal is changed and failure detection signals having different signal levels are thus output. In this embodiment, a failure detection signal during normal operation is High level, and a failure detection signal when failure occurs is Low level.

The main controller 219 converts failure detection signals into voltage levels that can be input to the CPU 1, and inputs the voltage levels to the CPU 1. The CPU 1 determines that, when a failure detection signal from a load is kept in Low level for a predetermined time, power supply failure occurs in the load. The CPU 1 monitors failure detection signals only when monitoring target functional units are mounted on the apparatus main body.

The protection circuit 220 includes a switch circuit 221 and an overcurrent protection circuit 222. When the functional unit is mounted on the apparatus main body, the switch circuit 221 gradually supplies DC electric power, which is supplied from the DC power distribution portion 206, to a load through the overcurrent protection circuit 222. When the functional unit is pulled out of the apparatus main body, the switch circuit 221 immediately shuts off the supply of DC electric power to the overcurrent protection circuit 222. When the functional unit is mounted on the apparatus main body, the overcurrent protection circuit 222 supplies DC electric power supplied from the switch circuit 221 to a load connected in a stage subsequent thereto. When power supply failure is detected in the load connected in the subsequent stage, the overcurrent protection circuit 222 shuts off the supply of DC electric power to the load and transmits a failure detection signal to the main controller 219.

In the following, a case is described in which a DC voltage of 5 [V] is applied to the VIN terminal. When the DC voltage applied to the VIN terminal has another voltage value, e.g., 12 [V] or 24 [V], rated values of the respective elements forming the protection circuit 220 are appropriately set depending on voltages and currents that are applied to the VIN terminal so that similar operation can be performed.

The switch circuit 221 includes transistors Q1, Q2, and Q3, a diode D1, a capacitor C1, and resistors R1, R2, R4, R5, and R6. FIG. 4 is a graph for showing operation waveforms of voltages and currents of the respective elements of the switch circuit 221. In FIG. 4, "IIN" indicates a value of a current that is applied from the apparatus main body to the VIN terminal, "Q1-G" indicates a voltage value of a gate terminal (gate voltage) of the transistor Q1, and "Q1-D" indicates a voltage value of a drain terminal (drain voltage) of the transistor Q1.

The transistor Q1 is a metal oxide semiconductor field effect transistor (MOSFET), and is an energization control element configured to control energization to the overcurrent protection circuit 222 with DC electric power that is supplied to the VIN terminal. A DC voltage is divided by the resistor R4 and the resistor R5 to be applied to a base terminal of the transistor Q2. The transistor Q2 is turned on with a base current depending on a value of a voltage applied to the base terminal. A current flows between a collector and an emitter of the transistor Q2 when the transistor Q2 is turned on. The capacitor C1 is a ceramic capacitor of 10 [µF], and is immediately charged when DC electric power is supplied to the VIN terminal.

Charges charged to the capacitor C1 flow into the GND terminal through the resistors R1 and R6 when the transistor Q2 is turned on. At this time, depending on a time constant that is determined based on a capacitance value of the capacitor C1 and resistance values of the resistors R1 and R6, the rate of the charges flowing into the GND terminal is changed, and a terminal voltage V1 of a cathode terminal of the diode D1 drops. A gate voltage of the transistor Q1 also drops depending on the terminal voltage V1. A drain current gradually flows through the transistor Q1 depending on a voltage difference between a gate and a source of the transistor Q1, which is changed due to those changes.

When the functional unit is mounted on the apparatus main body and DC electric power is supplied from the VIN terminal, the transistor Q1 gradually supplies DC electric power to the overcurrent protection circuit 222 through the series operation described above. The switch circuit 221 functions as a slow start circuit.

A capacitor C2 is connected on a DC electric power supply line from the switch circuit 221 to the overcurrent protection circuit 222. The capacitor C2 is a large-capacity ceramic capacitor of 44 [µF], and is a capacitive element configured to instantly back up a large current generated due to ground fault occurring inside the functional unit. Thus, the capacitor C2 needs to have a large capacity and a low equivalent series resistance (ESR). Hitherto, when a functional unit is mounted on the apparatus main body through the drawer connectors 210 and 211, a large current is instantly generated for charging the capacitor C2. In this embodiment, this instantaneous large current can be prevented because the switch circuit 221 functions as the slow start circuit, and thus power is gradually supplied to the overcurrent protection circuit 222.

When the functional unit is pulled out of the apparatus main body, the supply of DC electric power to the switch circuit 221 is shut off, with the result that the transistor Q2 does not have the base current anymore and is thus turned off. At that moment, a potential of the terminal voltage V1 becomes the same as that of the VIN terminal. The gate voltage of the transistor Q1 is maintained to the same voltage as that when the transistor Q2 is turned on because the transistor Q1 is disconnected from the transistor Q2 by the diode D1. A base current flows through the transistor Q3 because the gate voltage of the transistor Q1 is lower than the terminal voltage V1, to thereby turn on the transistor Q3. The charges charged to the capacitor C1 flow through the resistor R2 so that the gate voltage of the transistor Q1 may become the same as a voltage of the VIN terminal. A resistance value of the resistor R2 is set to be smaller than that of the resistor R1 so that the gate voltage of the transistor Q1 is quickly increased to eliminate a potential difference between the gate and the source of the transistor Q1, thereby turning off the transistor Q1. In this embodiment, the resistance value of the resistor R1 is 10 [kΩ], and the resistance value of the resistor R2 is 100 [Ω].

When the functional unit is pulled out of the apparatus main body, through the series operation described above, the transistor Q1 is quickly turned off to shut off the supply of DC electric power to the overcurrent protection circuit 222. The switch circuit 221 functions as a fast off circuit.

In this manner, the switch circuit 221 controls energization by the transistor Q1 with an energization control signal that is the gate voltage of the transistor Q1 depending on insertion/removal of the functional unit into/from the apparatus main body. With this, the switch circuit 221 controls the supply of electric power to a load depending on insertion/removal of the functional unit into/from the apparatus main body. The configuration of the switch circuit 221 excluding the transistor Q1 generates energization control signals.

When the functional unit is inserted into or removed from the apparatus main body, the supply of DC electric power and shut off of the supply are instantly switched from each other due to chattering at the contact between the drawer connector 210 and the drawer connector 211. As a result, in some cases, DC electric power is supplied again from the VIN terminal while a potential difference between the gate and the source of the transistor Q1 remains due to residual voltage. In this case, the switch circuit 221 does not function as the slow start circuit, the transistor Q1 remains in the ON state, and a large current flows through the overcurrent protection circuit 222. However, the switch circuit 221 functions as the fast off circuit. Therefore, even when DC electric power is instantly shut off, the switch circuit 221 turns off the transistor Q1 following the shut off. As a result, the switch circuit 221 stably functions as the slow start circuit at a start of next DC electric power supply as well.

The overcurrent protection circuit 222 includes transistors Q4, Q5, and Q6, a diode D2, capacitors C3 and C4, resistors R7 to R13, an operational amplifier 223, and a comparator 224. FIG. 5 is a graph for showing operation waveforms of voltages and currents of the respective elements of the overcurrent protection circuit 222. In FIG. 5, "IOUT" indicates a value of a current that is applied from the overcurrent protection circuit 222 to the VOUT terminal, "Q4-S" indicates a voltage value of a source terminal (source voltage) of the transistor Q4, "Q4-G" indicates a voltage value of a gate terminal (gate voltage) of the transistor Q4, and "Q5-B" indicates a voltage value of a base terminal (base voltage) of the transistor Q5.

The transistor Q4 is a MOSFET, and is a supply control element configured to control the supply of DC electric power to a load connected in a stage subsequent thereto. For example, when a large current of a predetermined amount or more flows through an output-side VOUT connected between the transistor Q4 and the load due to failure, the transistor Q4 shuts off the supply of DC electric power to the load in the subsequent stage. A DC voltage that is applied when the transistor Q1 of the switch circuit 221 is turned on is divided by the resistors R7 and R8, to thereby generate a reference voltage V2. The resistor R13 connected between the transistor Q4 and the VOUT terminal is a resistor for detecting current. The resistor R13 is set to have a sufficiently small resistance value in order to minimize electric power consumption and a voltage drop. In this embodiment, the resistance value of the resistor R13 is 10 [mΩ]. The operational amplifier 223 differentially amplifies a voltage across both terminals of the resistor R13. The operational amplifier 223 amplifies a potential difference between the terminals of the resistor R13 when a current flows through the resistor R13, and inputs an output value V3 to the comparator 224.

The comparator 224, which has open collector output, compares the reference voltage V2 and the output value V3 of the operational amplifier 223 to each other, and outputs an output value V4. The output value V4 is in Low level when the reference voltage V2 is larger than the output value V3, and is high impedance when the output value V3 is larger than the reference voltage V2.

When the functional unit normally operates, the reference voltage V2 is larger than the output value V3 because no large current flows through the resistor R13. A potential difference is generated between a source and a gate of the transistor Q4 through the capacitor C4 and the resistors R9 and R10, and the transistor Q4 is thus turned on. After the transistor Q4 is turned on, DC electric power is supplied to a load inside the functional unit through the resistor R13, and a predetermined current flows through the resistor R13. When failure occurs in the functional unit and the VOUT terminal is inadvertently grounded, a large current flows through the resistor R13 immediately after the transistor Q4 is turned on. In this embodiment, a current larger than 1.5 [A] is defined as a large current.

When the potential difference between both the terminals of the resistor R13 becomes equivalent to a current exceeding 1.5 [A], the output value V3 becomes larger than the reference voltage V2. The output value V4 of the comparator 224 becomes high impedance to have the same potential as a source potential of the transistor Q4. Consequently, the transistor Q4 is turned off. No current flows through the resistor R13 when the transistor Q4 is turned off. As a result, the reference voltage V2 becomes larger than the output value V3, the output value V4 of the comparator 224 becomes Low level again, and the transistor Q4 is turned on again.

Through the series operation of the transistor Q4 described above, the power supply current is kept at a constant current equivalent to 1.5 [A] that is set based on the reference voltage V2. A voltage of the output value V4 of the comparator 224 is in oscillation operation in which the voltage alternately and repeatedly becomes Low level and a level of the source voltage of the transistor Q4. When the voltage of the output value V4 is the level of the source voltage of the transistor Q4, the capacitor C3 is charged through the diode D2 depending on a time constant that is determined based on the resistor R11 and the capacitor C3. When the output value V4 is Low level, the capacitor C3 is discharged depending on a time constant that is determined based on the capacitor C3 and the resistor R12. A resistance value of the resistor R12 is set to be larger than a resistance value of the resistor R11 because a time constant for discharging needs to be larger than that for charging.

This operation is repeated, and when the base voltage of the transistor Q5 exceeds a predetermined voltage, the base current flows to turn on the transistor Q5. When the transistor Q5 is turned on, the base current flows through the transistor Q6 to turn on the transistor Q6 as well. As a result, because the reference voltage V2 and the source voltage of the transistor Q4 become the same level, and the overcurrent protection circuit 222 is fixed to a state in which the output value V3 is larger than the reference voltage V2, the output value V4 of the comparator 224 is high impedance thereafter. The transistor Q4 is always turned off to shut off the supply of DC electric power to the VOUT terminal.

In this manner, the overcurrent protection circuit 222 controls energization by the transistor Q4 with a supply control signal that is the gate voltage of the transistor Q4 depending on an amount of current flowing through the VOUT terminal. As a result, the overcurrent protection circuit 222 can shut off the supply of electric power when power supply failure occurs in a load and a large current flows through the VOUT terminal. The configuration of the overcurrent protection circuit 222 excluding the transistor Q4 generates supply control signals.

The functional unit includes the overcurrent protection circuit 222 as the power supply input portion, and thus shuts off the supply of power when power supply failure is detected on the load side. In addition, the functional unit also includes the switch circuit 221, and can thus stably operate even when chattering occurs during insertion or removal of the drawer connector 211. The main controller 219 can determine power supply failure on the functional unit side for each functional unit, and causes of power supply failure occurring inside the apparatus main body can be easily identified. Further, because the power source protection means is arranged on the functional unit side, the circuit scale can be reduced so as not to greatly affect the area of the control board on the functional unit side, and the configuration can be achieved inexpensively.

The invention claimed is:

1. An image forming apparatus comprising:
   a plurality of functional units, each functional unit being configured to serve as hardware configured to execute a given function for forming an image; and
   an apparatus main body comprising (i) a power source configured to supply electric power to each functional unit of the plurality of functional units, and (ii) a main controller configured to control an operation of the plurality of functional units, wherein each functional unit of the plurality of functional units is configured to be mounted on the apparatus main body such that each functional unit is able to be pulled out of the apparatus main body, wherein each functional unit of the plurality of functional units comprises:

a load to be driven by electric power that is supplied from the power source;

a switch circuit configured (i) to gradually supply the electric power, which is supplied from the power source, to the load when the functional unit is mounted on the apparatus main body, and (ii) to shut off the supply of the electric power to the load when the functional unit is pulled out of the apparatus main body; and an overcurrent protection circuit configured (i) to shut off the supply of the electric power to the load when the overcurrent protection circuit detects failure of the supply of the electric power to the load, and (ii) to transmit, to the main controller, a detection signal indicating the failure of the supply of the electric power to the load.

2. The image forming apparatus according to claim 1, wherein the switch circuit of each functional unit of the plurality of functional units comprises an energization control element configured to control energization of the electric power to the load, wherein the switch circuit is configured (i) to generate an energization control signal for gradually supplying electric power by the energization control element when the functional unit is mounted on the apparatus main body, and (ii) to shut off the energization by the energization control element when the functional unit is pulled out of the apparatus main body.

3. The image forming apparatus according to claim 1, wherein the overcurrent protection circuit of each functional unit of the plurality of functional units is connected between the switch circuit and the load, and the overcurrent protection circuit comprises a supply control element configured to supply the electric power, which is supplied from the switch circuit, to the load, wherein the overcurrent protection circuit is further configured to generate a supply control signal for disconnecting the supply control element when a current of a predetermined amount or more flows between the supply control element and the load.

4. The image forming apparatus according to claim 3, wherein the overcurrent protection circuit of each functional unit of the plurality of functional units is further configured to detect a change in voltage value between the supply control element and the load to output the detection signal.

5. The image forming apparatus according to claims 1, further comprising, between the switch circuit and the overcurrent protection circuit of each functional unit of the plurality of functional units, a capacitive element configured to back up a current that is generated when ground fault occurs, wherein the capacitive element is gradually supplied with the electric power by the switch circuit when the functional unit is mounted on the apparatus main body.

6. The image forming apparatus according to claims 1, wherein the power source of the apparatus main body is further configured to generate DC electric power from commercial AC electric power, and to individually supply the generated DC electric power to the plurality of functional units.

7. The image forming apparatus according to claim 6, wherein the power source of the apparatus main body is further configured to generate the DC electric power having a plurality of different voltage values from the commercial AC electric power, and to individually supply the generated DC electric power having respective voltage values to the plurality of functional units.

8. The image forming apparatus according to claims 1, wherein the main controller of the apparatus main body is further configured to monitor failure of the supply of the electric power depending on the detection signal per power supply system of each functional unit of the plurality of functional units.

9. The image forming apparatus according to claim 1, wherein one functional unit of the plurality of functional units is an image forming unit configured to form a toner image on a photosensitive unit.

10. The image forming apparatus according to claim 1, wherein one functional unit of the plurality of functional units is a transfer unit having an intermediate transfer portion on which a toner image is transferred.

11. The image forming apparatus according to claim 1, wherein one functional unit of the plurality of functional units is a fixing unit configured to fix a toner image transferred on a sheet.

12. The image forming apparatus according to claim 1, wherein each functional unit of the plurality of functional units receives power from the power source via a drawer connector.

* * * * *